United States Patent [19]

Mazanec et al.

[11] Patent Number: 4,802,958

[45] Date of Patent: Feb. 7, 1989

[54] PROCESS FOR THE ELECTROCATALYTIC OXIDATION OF LOW MOLECULAR WEIGHT HYDROCARBONS TO HIGHER MOLECULAR WEIGHT HYDROCARBONS

[75] Inventors: Terry I. Mazanec, Solon; Thomas L. Cable, Newbury, both of Ohio

[73] Assignee: The Standard Oil Company, Ohio

[21] Appl. No.: 26,663

[22] Filed: Mar. 17, 1987

[51] Int. Cl.⁴ .................................................. C25B 3/02
[52] U.S. Cl. ........................................ 204/80; 204/79; 204/72; 429/40; 429/41; 429/44
[58] Field of Search .................. 204/79, 80, 59 R, 72; 429/40, 41, 44

[56] References Cited

U.S. PATENT DOCUMENTS 3,097,115  7/1963  Moos ........................ 429/40
4,329,208  5/1982  Vayenas et al. .......... 204/59 R
4,430,391  2/1984  Ovshinsky et al. ...... 429/40

FOREIGN PATENT DOCUMENTS 61-030688  2/1986  Japan.

OTHER PUBLICATIONS

Ind. Eng. Chem. Process Dev., vol. 18, No. 4, pp. 567–579.
Otsuka et al, Chemistry Letters, (Japan) pp. 319–322, 1985.
Otsuka et al, Chemistry Letters, (Japan) pp. 499–500, 1985.
Bull. Chem. Soc. Jpan., 57, 3286–3289 (1984).
Ito et al, Nature, 1985, 314, 721–722.
Ito et al, J. Am. Chem. Soc., vol. 107, No. 18 (1985), pp. 5062–5068.
Goffe et al, Journal of Applied Electorchemistry, 11, (1981) 447–452.
Nguyen et al, J. Electrochem Soc.: Electrochemical Science and Technology, Sep., 1986, pp. 1807–1815.
Seimanides et al, "Catalytic and Electrocatalytic Oxidation of Methane in a Sold Electrolyte Cell", AICHE. Mtg., Miami, Florida, Nov. 1986.

Primary Examiner—John F. Niebling
Assistant Examiner—Kathryn Gorgos
Attorney, Agent, or Firm—Raymond F. Keller; David J. Untener; Larry W. Evans

[57] ABSTRACT

An electrocatalytic process is described for producing higher molecular weight hydrocarbons from lower molecular weight hydrocarbons. The process is conducted in an electrogenerative cell and generally comprises the steps of (A) providing a fuel cell comprising a solid electrolyte having a first surface coated with conductive metal, metal oxide or mixtures thereof capable of catalyzing the reduction of oxygen to oxygen ions, and a second surface coated with metal, metal oxide or mixtures thereof, provided that when both coatings are silver coatings, or the first coating is silver and the second coating is a silver/bismuth coating, the second coating also contains at least one other metal, the two conductive coatings being connected by an external circuit, (B) passing an oxygen-containing gas in contact with the first conductive coating while, (C) passing a low molecular weight hydrocarbon-containing feed gas in contact with the second conductive coating, and (D) recovering higher molecular weight hydrocarbons.

21 Claims, 1 Drawing Sheet

PROCESS FOR THE ELECTROCATALYTIC OXIDATION OF LOW MOLECULAR WEIGHT HYDROCARBONS TO HIGHER MOLECULAR WEIGHT HYDROCARBONS

TECHNICAL FIELD

This invention relates to an electrocatalytic process for producing higher molecular weight hydrocarbons from lower molecular weight hydrocarbons. The process of the invention is a continuous process for the production of higher molecular weight hydrocarbons while generating electricity in an electrogenerative reactor.

BACKGROUND OF THE INVENTION

Dehydrogenation processes for the conversion of low molecular weight organic compounds to compounds having a higher molecular weight are well known. Continued efforts have been made in recent years to improve such processes in order to improve the conversion rate and selectivity to desired products. The present invention describes a continuous process for the electrocatalytic oxidation of lower molecular weight hydrocarbons such as methane and ethane to higher molecular weight hydrocarbons such as those containing from 2 to 5 carbon atoms. In the present invention, water is a by-product, and electricity is generated.

Electrogenerative and voltameiotic processes are reviewed and compared with conventional electrochemical and heterogeneous processes in *Ind. Eng. Chem. Process Dev.*, Vol. 18, No. 4, pp. 567–579. Oxidation reactions are discussed on page 576.

U.S. Pat. No. 4,329,208 describes the oxidation of ethylene to ethylene oxide in an electrochemical cell which is similar to the electrochemical cell utilized in the present invention.

Otsuka et al in *Chemistry Letters*, (Japan) pages 319–322, 1985, describe the conversion of methane to ethane/ethylene in an electrocatalytic cell using silver and silver/bismuth oxide as the anode materials. In an earlier publication, *Bull. Chem. Soc. Jpn.*, 57, 3286–3289 (1984), the same authors have described steam reforming of hydrocarbons through a wall of stabilized zirconia which acts as a hydrogen separator. The desired product is hydrogen with a minimum of carbon dioxide, carbon monoxide or hydrocarbons.

More recently, Seimanides and Stoukides reported on the oxidation of methane in a solid electrolyte cell using catalysts such as silver and lithium/magnesium oxide-silver. Ethylene, ethane, carbon monoxide and carbon dioxide were the main products. Electrochemical techniques were applied to increase the selectivity to $C_2$ products (Preprint, AIChE Meeting, Miami, Fla., November, 1986).

Otsuka et al *Chemistry Letters* (Japan), 1985, 499–500 describe the selective oxidation of methane to ethane and/or ethylene in a conventional heterogeneous catalytic reactor. A low pressure mixture of oxygen and methane in helium is passed over a metal oxide catalyst at 700° C. Among the metal oxides described as active for this reaction are included rare earth, main group metals and transition metals.

The use of lithium/magnesium oxide catalysts for methane oxidation to ethane/ethylene is described by Ito and Lunsford in *Nature*, 1985, 314, 721–722. These authors describe passing low pressures of methane and oxygen over lithium carbonate-doped magnesium oxide and producing ethane and ethylene among the products.

Lithium-promoted magnesium oxide catalysts also are described by Ito et al in *J. Am. Chem. Soc.*, Vol. 107, No. 18 (1985), pp. 5062–68.

The electro-oxidation of hydrocarbon fuels commonly derived from coal (e.g., CO, $CH_4$ and $H_2$) using a disc of scandia-stabilized zirconia is discussed by R. A. Goffe and D. M. Mason, *Journal of Applied Electrochemistry*, 11, (1981) 447–452. The anodic face was coated with either porous platinum or gold as the electrode material, and the cathode face was coated with porous platinum. The reactor was operated at 700° C. in one atmosphere in both the self-generated-power (fuel-cell) mode and the applied-power mode. The products of the reacction are described as being $CO_2$ and water. The authors state that the possibility of side reactions suggest the interesting prospects of obtaining both electrical energy and useful products from the solid electrolyte fuel cells.

The electrocatalytic reactivity of hydrocarbons on a zirconia electrolyte surface is described by B. C. Nguyen, T. A. Lin and D. M. Mason in *J. Electrochem Soc.: Electrochemical Science and Technology*, September, 1986, pp. 1807–1815.

Numerous publications describe the complete oxidation of methane to carbon dioxide and water in fuel cells. These proceses are not designed to be chemical processes, but rather to generate electricity from a fuel gas and air (or oxygen). The selectivity of these processes is designed for complete combustion rather than partial combustion.

SUMMARY OF THE INVENTION

An electrocatalytic process is described for producing higher molecular weight hydrocarbons from lower molecular weight hydrocarbons. The process is conducted in an electrogenerative cell and generally comprises the steps of (A) providing a fuel cell comprising a solid electrolyte having a first surface coated with conductive metal, metal oxide or mixtures thereof capable of catalyzing the reduction of oxygen to oxygen ions, and a second surface coated with metal, metal oxide or mixtures thereof, provided that when both coatings are silver coatings, or the first coating is silver and the second coating is a silver/bismuth coating, the second coating also contains at least one other metal, the two conductive coatings being connected by an external circuit, (B) passing an oxygen-containing gas in contact with the first conductive coating while, (C) passing a low molecular weight hydrocarbon-containing feed gas in contact with the second conductive coating, and (D) receiving higher molecular weight hydrocarbons.

DESCRIPTION OF THE PREFERRED EMBODIMENTS

This invention provides a continuous process for converting low molecular weight hydrocarbons to higher molecular weight hydrocarbons and water in an electrogenerative cell. In one embodiment, methane can be converted to hydrocarbons containing 2 to 5 carbon atoms.

Figure 1:
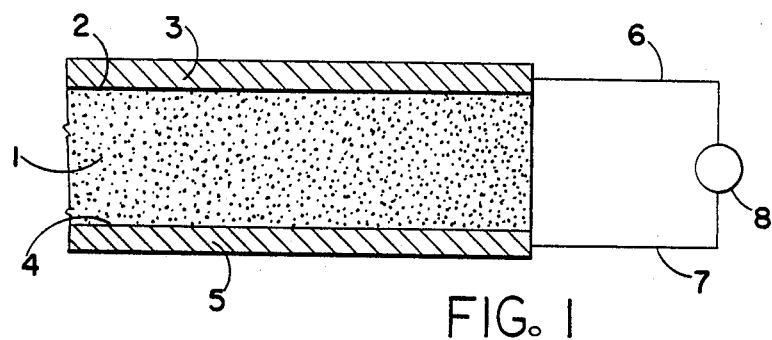
FIG. 1 is a side view, and cross-section of the apparatus suitable for carrying out the process of this invention.

The process of the present invention is conducted in an electrogenerative cell such as schematically represented in FIG. 1 wherein a core of solid electrolyte 1 is coated on one surface 2 with a catalyst 3 useful for reducing oxygen to oxygen ions. This coating provides the cathode side of the cell. On a second surface 4 of the core of solid electrolyte 1 is another coating of catalyst 5. This coating is the anode. The two coatings are connected by an external circuit through wire leads 6 and 7. An ammeter 8 means may be included in the circuit. A battery may also be included in the circuit for applying an electric potential between the two conductive coatings (electrodes).

In practice, an oxygen-containing gas or gas mixture is passed in contact with the first conductive coating (the cathode), and a low molecular weight hydrocarbon containing feed gas is passed in contact with the second conductive coating (anode). As the oxygen-containing gas contacts the first conductive coating, oxygen is reduced to oxide ions which are transported through the solid electrolyte to the anode side. At the anode side (second conductive coating), the oxide ions react with the low molecular weight hydrocarbon to produce a higher molecular weight hydrocarbon and water, and the electrons are released. The electrons return to the cathode side via the external circuit. In this manner, the reactor generates a current in addition to oxidizing the low molecular weight hydrocarbons to higher molecular weight hydrocarbons.

The solid electrolytes used in the process of this invention can be any material which can transfer oxygen ions under the conditions of the process. Typically, oxygen ion conducting solid electrolytes are solid solutions formed between oxides containing divalent and trivalent cations such as calcium oxide, scandium oxide, yttrium oxide, lanthanum oxide, etc. with oxides containing tetravalent cations such as zirconia, thoria and ceria. Their higher ionic conductivity is due to the existence of oxygen ion site vacancies. One oxygen ion vacancy occurs for each divalent or each two trivalent cations that are substituted for a tetravalent ion in the lattice. Some of the known solid oxide transfer materials include $Y_2O_3$-stabilized $ZrO_2$, CaO-stabilized $ZrO_2$, $Sc_2O_3$-stabilized $ZrO_2$, $Y_2O_3$-stabilized $Bi_2O_3$, $Y_2O_3$-stabilized $CeO_3$, CaO-stabilized $CeO_2$, $ThO_2$, $Y_2O_3$-stabilized $ThO_2$, or $ThO_2$, $ZrO_2$, $Bi_2O_3$, $CeO_2$, or $HfO_2$ stabilized by addition of any one of the lanthanide oxides or CaO. The preferred solid electrolytes are the $Y_2O_3$-(yttria) and CaO-(calcia) stabilized $ZrO_2$ (zirconia) materials. These two solid electrolytes are characterized by their high ionic conductivity, their pure oxygen ion conduction over wide ranges of temperature and oxygen pressure, and their relatively low cost.

The conductive coating on the solid electrolyte utilized as the cathode may be any material capable of reducing oxygen to oxygen ions. Examples of metals and metal oxides useful in the preparation of the cathode include silver, nickel, gold, bismuth, platinum, palladium, copper, cobalt, chromium, iron, lanthanum-manganese, lanthanum-manganese-strontium, indium oxide-stannous oxide mixtures, or any mixtures of said metals and metal oxides. The conductive coating on the second surface of the solid electrolyte (the anode) can be any of a wide variety of conductive materials capable of catalyzing the oxidative conversion of low molecular weight of saturated hydrocarbons to higher molecular weight hydrocarbons. Examples of metals and metal oxides useful in forming the anode coating include silver, nickel, gold, bismuth, manganese, vanadium, platinum, palladium, copper, zinc, cobalt, chromium, iron, molybdenum, samarium, holmium, ruthenium or indium oxide-stannous oxide mixtures, or any mixtures of said metals and metal oxides such as Ag/Bi, Ag/Sm, Pt/Bi, Ag/Mo, Ag/Ho, Ag/Mo/Bi, Bi/Mo, etc., provided that when both the anode and cathode are silver coatings, or the cathode is silver and the anode is a silver/bismuth coating, the anode coating also contains at least one other metal listed above or an alkali and/or alkaline earth metal or metal oxide. Mixtures such as silver/bismuth are particularly useful.

In one preferred embodiment, the anode also contains, in addition to any of the above-identified conductive metals, an alkali and/or alkaline earth metal or metal oxide such as lithium, sodium, potassium, rubidium, cesium, berylium, magnesium, calcium, strontium, barium and the corresponding oxides. The combination of lithium and magnesium is particularly useful. The amount of alkali and/or alkaline earth metals included in the anode may be varied from about 1 to about 50% by weight, and is preferably between about 5 to about 20% by weight. Examples of such mixed anodes include Cu/Li/Mg, Ag/Li/Mg, Ni/Li, Ag/Sm/Li/Mg, etc.

The alkali and/or alkaline earth metal or metal oxides may be included in the conductive material either before or after the conductive material is deposited on the surface of the solid electrolyte. It is also possible to dope, coat, or otherwise treat the anode with additional materials to influence its stability, structure and/or reactivity for surface interactions with the saturated hydrocarbons. In one embodiment of this invention, the anode can be "blackened" by rapidly changing the polarity of an applied potential while maintaining the electrolyte at an elevated temperature.

The oxygen-containing gas which is passed in contact with the first conductive coating or cathode can be air, pure oxygen, or any other gas containing at least 1% oxygen. In another embodiment, the oxygen-containing gas does not contain dioxygen, but rather contains oxygen in other forms such as $N_2O$, $CO_2$, $SO_2$, $NO_2$, NO, etc. Preferably, the oxidizing gas is air.

The low molecular weight hydrocarbon-containing feed gases which are treated in accordance with the process of the present invention may comprise methane, ethane, natural gas, propane, etc. Preferably the feed gas is methane or natural gas. The methane-containing feed gas can be natural gas or any other gas which contains at least 1% methane. The natural gas can be either wellhead natural gas or processed natural gas. The composition of the processed natural gas varies with the needs of the ultimate user. A typical processed natural gas composition contains about 70% by weight of methane, about 10% by weight of ethane, 10% to 15% of $CO_2$, and the balance is made up of smaller amounts of propane, butane and nitrogen.

The higher molecular weight hydrocarbons obtained by the process of the invention generally are mixtures of hydrocarbons containing from 2 to about 5 carbon atoms. For example, when the initial gas is methane, the product mixture may comprise ethane, ethylene, acetylene, propane, butane and pentane. In the embodiments described herein, the C$_2$ hydrocarbons predominate.

The low molecular weight hydrocarbon gas feed can be mixed with any inert diluent such as nitrogen, helium, neon, argon, krypton, xenon or any other gas, including steam, which does not interfere with the oxidation of the low molecular weight hydrocarbon. Nitrogen and steam are diluents of choice.

The preferred cathode and anode materials comprise silver-containing metal compositions. In one preferred embodiment, the anode material will comprise silver-containing metal compositions which also contain other metals including alkali and/or alkaline earth metal or metal oxides. Li and Mg are the preferred alkali and alkaline earth metals. In another preferred embodiment, the second conductive coating, namely, the anode, comprises a platinum-containing metal composition, preferably also containing an alkali and/or alkaline earth metal or metal oxide.

Figure 2:
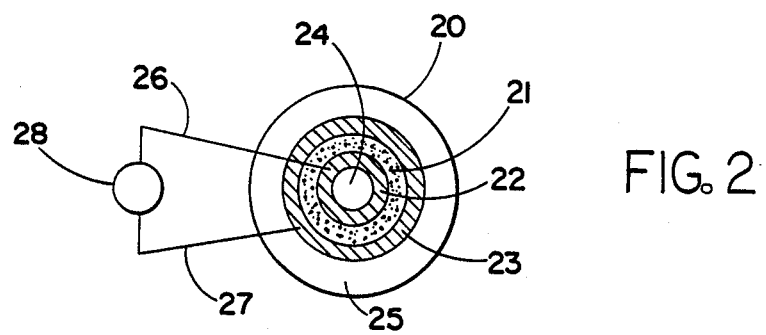
FIG. 2 is a top view, and cross-section of a fuel cell reactor useful for carrying out the process of the invention.
Figure 3:
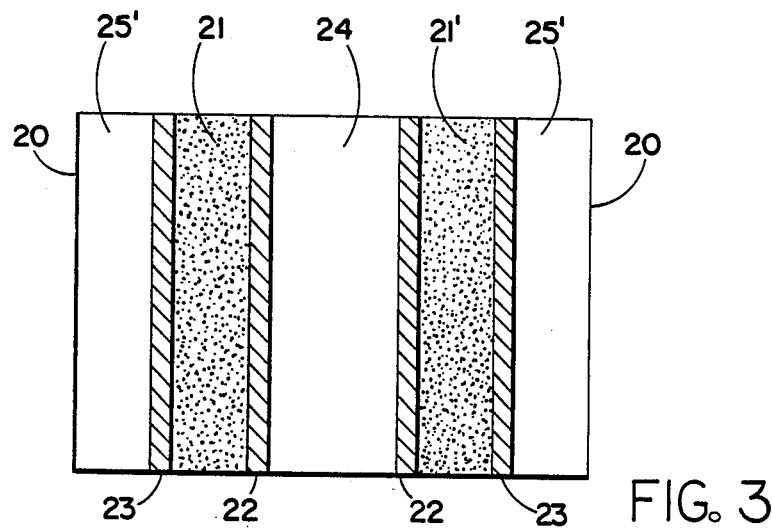
FIG. 3 is a side view, and cross-section of the reactor shown in FIG. 2.

The present invention may be further exemplified by reference to FIGS. 2 and 3. FIG. 2 is a top view of a fuel cell useful in conducting the process of the present invention, and FIG. 3 is a side view of the same cell. In both FIGS. 2 and 3, the fuel cell comprises a shell 20 in which is placed a circular solid cylindrical electrolyte core 21. The inside surface of the solid electrolyte 21 is coated with an electrically conductive metal or metal oxide which serves as the cathode 22. The outer surface of the solid electrolyte 21 is coated with an electrically conductive material 23 which serves as the anode. A wire lead 26 is attached to the inside coating 22, and a second wire lead 27 is attached to the outside coating 23, and the two wire leads are connected to form an external circuit through ammeter 28. A battery may be connected in series with the ammeter. As can be seen from the construction illustrated in FIGS. 2 and 3, the cell contains an inner open space 24 through the center of the cell and an outer open space 25 between the outer coating 23 or anode and the shell 20.

In practice, the process of the present invention is conducted with an apparatus such as illustrated in FIGS. 2 and 3 by passing an oxygen-containing gas through the inner open space 24 and a low molecular weight hydrocarbon-containing gas through the outer open space 25. The oxygen-containing gas which contacts the inside conductive coating 22 is converted to oxygen ions which migrate through the solid electrolyte 21 to contact the outside conductive coating 23. At the surface of the outside coating 23, the oxygen ion reacts with the low molecular weight hydrocarbon contacting the outside conductive coating 23 to form one or more higher molecular weight hydrocarbons. During this reaction, the oxygen ion loses two electrons which travel from the outer conductive coating 23 through the circuit formed by leads 26 and 27 and the ammeter/battery 28 to the inner surface coating 22.

In another embodiment, the anodes and cathodes are reversed. That is, inside conductive coating 22 is the anode and the outer conductive coating 23 is the cathode. In this embodiment, the oxygen containing gas is passed through the outer open space 25, and the hydrocarbon passed through the inner or central open space 24. Otherwise, the process in this embodiment is the same as the embodiment discussed above.

The process of the present invention generally is conducted at an elevated temperature of at least about 500° C. More generally, the process will be conducted at a temperature of from about 500° C. to about 1100° C. In a preferred embodiment, for example, when the low molecular weight hydrocarbon gas comprises methane, the reaction is conducted at a temperature of about 700° C. to about 950° C.

The process of the present invention generally is conducted at a pressure of from about 0.1 to about 100 atmospheres, more preferably between about 0.5 to about 10 atmospheres. A particularly preferred pressure is 1 atmosphere.

The flow rate of the hydrocarbon through the reactor may be varied as desired so long as there is sufficient contact by the hydrocarbon with the anode to result in oxidative conversion to a higher molecular weight hydrocarbon. Contact times of from 0.1 to about 100 seconds may be used and contact times of from 1 to 20 seconds are generally sufficient.

In one embodiment of the invention, the conversion of low molecular weight hydrocarbons to higher molecular weight hydrocarbons is improved by applying an electric potential between the anode and cathode. Generally, a potential of up to about 4 volts can be applied between the electrodes. The desired electric potential can be applied by the use of a battery installed in the external circuit formed by 26, 27 and 28 in FIGS. 2 and 3.

In the following specific examples, the low molecular weight hydrocarbons are treated in accordance with the method of the present invention in a laboratory reactor similar to the reactor described in FIGS. 2 and 3. The reactor is made from a 60 cm. long (10 mm. OD, 8 mm. ID) tube of 8% yttria-stabilized zirconia obtained from Zircoa Products (Corning). The inside of the tube is coated with a thin layer of silver ink (Engelhard A3148) diluted with terpineol to provide a permeable cathode. A stripe of silver ink is painted onto the outside of the tube from one end to about the center. The tube is heated in air at 750° C. for about 15 minutes.

The outer surface of the tube then is coated with the anode material, overlapping slighly the silver stripe. The silver-containing anodes are prepared from silver ink or silver oxide slurried with acetone. The bismuth-containing silver anodes are prepared by adding bismuth nitrate solution to the silver ink or silver oxide slurry. The samarium-containing silver anodes are prepared by adding samarium nitrate solutions to the silver ink or silver oxide slurry.

The specific anodes used in the following illustrative examples of the invention are prepared as follows:

Ag: A tube is coated with silver ink (Engelhard a 3148).

Ag/Bi: A tube is coated with a mixture of silver oxide (Ag$_2$O) and bismuth nitrate [Bi(NO$_3$)$_3$.5H$_2$O] in water (Ag/Bi=2:1).

Ag/Sm: A tube is coated with a mixture of silver oxide (Ag$_2$O) and sammarium nitrate [Sm(NO$_3$)$_3$.5H$_2$O] in water (Ag:Sm=2:1).

Ag/Li/Mg: A tube is coated sequentially with silver ink (A3148), and then with a slurry of magnesium oxide (MgO) and lithium carbonate [Li$_2$CO$_3$] (14.6% w lithium) in water.

Ag/Bi/Li/Mg: A tube is given a Ag/Bi coating as above and then is coating with a slurry of magnesium oxide (MgO) and lithium carbonate [Li$_2$CO$_3$] (14.6% w lithium) in water.

Ag/Sm/Li/Mg: The tube coated sequentially with (1) samarium nitrate [$Sm(NO_3)_3.5H_2O$] as a water solution;
(2) a mixture of magnesium oxide [MgO] and lithium carbonate [$Li_2CO_3$] (14.6% w Li) as a slurry in water; and
(3) slurry of silver oxide [$Ag_2O$] in acetone. After each coating, the coating is heated to dryness at about 250° C. After the final coat, the tube is heated to about 700° C.

Ag/Mo: The tube is coated with a solution of ammonium heptamolybdate and then silver ink (Engelhard A 3148).

Ag/Ho: The tube is coated with a solution of holmium nitrate [$Ho(NO_3).5H_2O$] in water and then a slurry of silver oxide in acetone.

Bi/Mo: A mixture of ammonium heptamolybdate [$(NH_4)_6Mo_7O_{24}.4H_2O$] and bismuth nitrate [$Bi(NO_3)_3.5H_2O$] with Bi:Mo=2:3 in water is applied to the tube, dried, and heated to 700° C.

Pt/Bi: A mixture of tetraamine platinum nitrate [$Pt(NH_3)_4(NO_3)_2$] and bismuth nitrate in water (Pt:Bi=2:1) is applied to the tube, dried, and heated at 700° C.

Ag/Mo/Bi: A Ag/Mo coated tube prepared as above is coated with a solution of bismuth nitrate.

Ni/Li: A slurry of nickel oxide [NiO] and lithium carbonate in water is used (Ni:Li=9:1).

Cu: A slurry of copper (II) oxide [CuO] in water is used.

Cu/Li/Mg: A tube is coated with a slurry of magnesium nitrate and lithium carbonate (14.6% w Li) in water, and then is coated with a slurry of CuO in water.

Pt: A tube is coated with platinum ink from Engelhard (#6926).

Pt/Bi: A platinum anode prepared as above is coated with a slurry of bismuth oxide [$Bi_2O_3$] in water.

Silver wires are attached to the ends of the two electrodes with solder. A 40 cm. section of 14 mm. OD quartz is fitted over the center section of the zirconia tube using SWAGELOK ™ tube fitting and teflon ferrules. A SWAGELOK ™ tube fitting also is attached to each end of the zirconia tube which extends out of the quartz sleeve. The assembly is placed in a split furnace capable of heating to 1100° C., and the silver wires are connected through an ammeter.

The electrodes are conditioned as follows: air is passed through the inside of the zirconia tube at 50 cc./min. Nitrogen is passed through the space between the zirconia and quartz tubes at the rate of 50 cc./min., and the tube is heated to 700° C. over the course of about 2 hours. As the reactor is heated, a current is observed in the circuit at about 380° C. At about 480° C. the current changes directions (−0.3 milliamp) and stays negative until the temperature reaches 545° C. The current then becomes positive (electron flow through the circuit from the anode to the cathode) and remains positive thereafter. After 10 minutes at 700° C., the nitrogen flow is replaced by the low molecular weight hydrocarbon, and the experiment commences.

In the following Examples 1–6 and Control-Examples C-1 to C-6, the hydrocarbon is methane and the feed rate is adjusted to 20 cc./min. Samples of the gaseous products are obtained at about 20 minute intervals, and the gas samples are analyzed by gas chromatography on either a Carle Series S 111 H or a Carle Series S 400 gas chromatograph outfitted to analyze refinery gas mixtures. The results summarized below in Table I are based upon averages of at least three gas samples, and the electric current values are steady-state values. In some of the experiments, an external potential was applied by means of a Hewlett-Packard 6214B power supply connected in series with the ammeter.

In Examples 1 through 6 and in the Control Examples 1–6, a silver cathode is utilized, and the anode is as described in the table. In the Control examples, the anode does not contain added Li/Mg. All of the experiments are conducted at atmospheric pressure.

| Example | Anode | Temp. °C. | Applied Voltage | Current mA | $CH_4$ Conv. %* | $C_2$ Select. %** |
|---|---|---|---|---|---|---|
| C-1 | Ag | 700 | 2.5 | 241 | 0.47 | 26.0 |
| 1 | Ag + Li/Mg | 700 | 0.6 | 254 | 3.1 | 22.4 |
| C-2 | Ag/Bi | 800 | 0.0 | 18.8 | 0.91 | 86.8 |
| C-3 | | 800 | 0.4 | 251 | 3.76 | 68.1 |
| C-4 | | 800 | 0.8 | 500 | 4.54 | 61.5 |
| 2 | Ag/Bi + Li/Mg | 800 | 0.0 | 23 | 0.9 | 36.3 |
| 3 | | 800 | 0.9 | 250 | 5.0 | 59.6 |
| 4 | | 800 | 1.8 | 485 | 9.2 | 52.4 |
| C-5 | Ag/Sm | 800 | 0.0 | 54 | 1.2 | 9.0 |
| C-6 | | 800 | 1.0 | 262 | 3.5 | 9.3 |
| 5 | Ag/Sm + Li/Mg | 800 | 0.0 | 43 | 1.1 | 77.7 |
| 6 | | 800 | 1.5 | 184 | 4.0 | 70.5 |

*$C_4$ Conversion $= \frac{\text{Moles C in all products}}{\text{Moles } CH_4 \text{ fed}}$

**$C_2$ Selectivity $= \frac{\text{Moles C in } C_2H_6 \text{ and } C_2H_4}{\text{Moles C in all products}}$ The results of Experiment 1 using a lithium/magnesium doped silver anode compared to Control-1 using an undoped anode shows the beneficial effect of Li/Mg in increasing conversion of methane without a significant loss in selectivity. The results of Experiments 2, 3 and 4 using a Li/Mg doped Ag/Bi anode, compared to Controls-2, -3 and -4 show the beneficial effect of Li/Mg in increasing the conversion of methane for Ag/Bi anodes without significant losses in selectivity.

The results of Examples 5 and 6 using a Li/Mg doped Ag/Sm anode compared to Controls-5 and -6 demonstrate the beneficial effect of Li/Mg in increasing the selectivity of the reaction for $C_2$ products.

The currents observed and recorded in the table show that electricity can be generated as a useful by-product by the oxidative dehydrogenation of ethane to ethylene, and that the methane conversion can be generally increased by the application of a voltage between the electrodes.

In the following Examples 7–43, the general procedure of Examples 1–6 is repeated with the exceptions noted in the following Table III including the type of anode and the methane feed rate.

TABLE III

| Example | Anode | Temp. °C. | Appl. Volt. | Current mA | $CH_4$ Feed mL/min. | $CH_4$ Conv. %* | $C_2$ Select. %** |
|---|---|---|---|---|---|---|---|
| 7 | BiMo | 700 | 3.2 | 250 | 19.4 | 0.2 | 16.0 |
| 8 | Bi | 700 | 1.5 | 1 | 19.4 | 0.2 | 22.0 |
| 9 | Pt/Bi | 700 | 0.0 | 1 | 20.3 | 0.2 | 43.2 |
| 10 | Pt/Bi | 700 | 1.5 | 28 | 20.3 | 0.4 | 20.0 |

TABLE III-continued

| Example | Anode | Temp. °C. | Appl. Volt. | Current mA | CH$_4$ Feed mL/min. | CH$_4$ Conv. %* | C$_2$ Select. %** |
|---|---|---|---|---|---|---|---|
| 11 | Pt/Bi | 800 | 0.0 | 7 | 20.3 | 0.4 | 57.0 |
| 12 | Pt/Bi | 800 | 1.5 | 69 | 20.3 | 1.3 | 63.6 |
| 13 | Pt/Bi | 900 | 0.0 | 19 | 19.4 | 0.9 | 44.6 |
| 14 | Pt/Bi | 900 | 1.5 | 131 | 19.4 | 2.3 | 42.7 |
| 15 | AgSm—LiMg | 800 | 0.2 | 100 | 9.7 | 3.9 | 58.6 |
| 16 | AgSm—LiMg | 800 | 0.2 | 100 | 50.2 | 0.9 | 76.8 |
| 17 | AgSm—LiMg | 900 | 0.0 | 54 | 19.7 | 1.3 | 51.0 |
| 18 | AgSm—LiMg | 900 | 1.5 | 190 | 19.7 | 3.2 | 42.0 |
| 19 | AgMo | 700 | 0.0 | 83 | 19.7 | 0.8 | 0.0 |
| 20 | AgMo | 800 | 0.0 | 148 | 19.7 | 2.7 | 0.0 |
| 21 | AgMo | 800 | 1.5 | 966 | 19.7 | 7.0 | 31.9 |
| 22 | AgMo | 800 | 1.5 | 980 | 59.7 | 1.9 | 46.8 |
| 23 | AgMo | 800 | 1.5 | 985 | 9.9 | 11.7 | 26.0 |
| 24 | AgMoBi | 800 | 0.0 | 96 | 20.0 | 1.0 | 8.7 |
| 25 | AgMoBi | 800 | 1.5 | 910 | 20.0 | 8.2 | 41.3 |
| 26 | AgHo | 700 | 0.0 | 10 | 21.0 | 0.1 | 0.0 |
| 27 | AgHo | 700 | 1.5 | 114 | 21.0 | 1.2 | 14.3 |
| 28 | AgHo | 800 | 0.0 | 20 | 21.0 | 0.8 | 24.9 |
| 29 | AgHo | 800 | 1.5 | 263 | 21.0 | 2.9 | 14.8 |
| 30 | AgHo | 900 | 0.0 | 65 | 21.0 | 2.4 | 24.9 |
| 31 | AgHo | 900 | 0.7 | 236 | 21.0 | 3.9 | 21.5 |
| 32 | AgHo | 900 | 1.5 | 546 | 21.0 | 6.7 | 11.5 |
| 33 | NiLi | 700 | 0.0 | 29 | 19.7 | 1.9 | 10.2 |
| 34 | NiLi | 700 | 1.5 | 211 | 19.7 | 3.5 | 15.9 |
| 35 | Cu | 700 | 0.0 | 4 | 21.4 | 0.3 | 0.0 |
| 36 | Cu | 700 | 1.5 | 68 | 21.4 | 0.8 | 0.0 |
| 37 | Cu | 800 | 0.0 | 8 | 21.4 | 0.3 | 37.2 |
| 38 | Cu | 800 | 1.5 | 108 | 21.4 | 1.2 | 16.6 |
| 39 | CuLiMg | 700 | 0.0 | 32 | 19.3 | 20.3 | 0.0 |
| 40 | CuLiMg | 700 | 1.5 | 49 | 19.3 | 1.2 | 9.2 |
| 41 | CuLiMg | 800 | 1.5 | 120 | 19.3 | 1.9 | 31.1 |
| 42 | Pt | 800 | 0.0 | 84 | 19.9 | 0.9 | 22.7 |
| 43 | Pt | 800 | 1.0 | 452 | 19.9 | 5.1 | 5.7 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An electrocatalytic process for converting methane to higher molecular weight hydrocarbons in an electrogenerative cell which comprises
   (A) providing a fuel cell comprising a solid electrolyte having a first surface coated with conductive metal, metal oxide or mixtures thereof capable of catalyzing the reduction of oxygen to oxygen ions, and a second surface coated with a conductive mixture comprising
      (i) conductive metal, metal oxides or mixtures thereof, and
      (ii) at least one alkali metal, the two conductive coatings being connected by an external circuit, wherein the first conductive surface is the cathode and the second conductive surface is the anode,
   (B) passing an oxygen-containing gas in contact with the first conductive surface at a temperature of from about 500° C. to about 950° C. while
   (C) passing a methane feed gas in contact with the second conductive coating at a temperature of from about 500° C. to about 950° C. and
   (D) recovering higher molecular weight hydrocarbons.

2. The process of claim 1 wherein the solid electrolyte comprises yttria-stabilized zirconia or calcia-stabilized zirconia.

3. The process of claim 1 wherein the coating on the first conductive surface comprises silver, nickel, copper, bismuth, platinum, palladium, zinc, cobalt, chromium, iron, lanthanum-manganese, lanthanum-manganese-zirconium, and indium oxide-stannous oxide mixtures or combinations thereof.

4. The process of claim 2 wherein the conductive coating on the second surface comprises mixtures of
   (i) silver, bismuth, manganese, vanadium, nickel, gold, copper, platinum, palladium, zinc, cobalt, chromium, iron, molybdenum, samarium, holmium, ruthenium, indium oxide-stannous oxide mixtures or combinations thereof, and
   (ii) at least one alkali and alkaline earth metal or metal oxide.

5. The process of claim 1 wherein the coatings on the first and second surfaces comprise silver-containing or platinum-containing metal compositions or mixtures of said compositions.

6. The process of claim 5 wherein the coating in the second surface also contains lithium and magnesium.

7. The process of claim 5 wherein the first or second coatings, or both coatings, also contain bismuth.

8. The process of claim 1 conducted at a temperature of from about 700° C. to about 950° C.

9. The process of claim 1 conducted at a pressure of from about 0.1 to about 100 atmospheres.

10. The process of claim 1 conducted at a pressure of from about 0.5 to about 10 atmospheres.

11. The process of claim 1 wherein the oxygen-containing gas is air or oxygen.

12. The process of claim 1 wherein an electric potential is applied between the two conductive coatings.

13. An electrocatalytic process for producing higher molecular weight hydrocarbons from methane in an electrogenerative cell which comprises
   (A) providing a fuel cell comprising a solid electrolyte having a first surface coated with a conductive coating comprising metal, metal oxide or mixtures thereof capable of catalyzing the reduction of oxygen to oxygen ions, and a second surface coated with a conductive coating comprising a mixture of
(i) silver-containing compositions, and
(ii) at least one alkali metal or metal oxide and at least one alkaline earth metal or metal oxide the two conductive coatings being connected by an external circuit, wherein the first conductive surface is a cathode and the second conductive surface is the anode, (B) passing an oxygen-containing gas in contact with the first conductive coating at a temperature of about 700° C. to about 950° C. while (C) passing methane in contact with the second conductive coating at a temperature of about 700° C. to about 950° C., and (D) recovering higher molecular weight hydrocarbons.

14. The process of claim 13 wherein the higher molecular weight hydrocarbons recovered in (D) comprise ethane and ethylene.

15. The process of claim 13 wherein the conductive coating on the second surface comprises silver, lithium and magnesium.

16. The process of claim 13 wherein the second coating also contains bismuth.

17. The process of claim 13 conducted at a pressure of from about 0.5 to about 10 atmospheres.

18. The process of claim 13 conducted at about atmospheric pressure.

19. The process of claim 13 wherein the oxygen-containing gas is air.

20. The process of claim 13 wherein an electric potential is applied between the two conductive coatings.

21. The hydrocarbon mixture prepared in accordance with the process of claim 13.

* * * * *